Jan. 19, 1943.   W. G. CLAYTON, JR   2,309,045
TRIMMING MACHINE
Filed Aug. 4, 1941   3 Sheets-Sheet 1

William G. Clayton, Jr. INVENTOR
BY Victor J. Evans & Co.
ATTORNEYS

Jan. 19, 1943.　　W. G. CLAYTON, JR　　2,309,045
TRIMMING MACHINE
Filed Aug. 4, 1941　　3 Sheets-Sheet 3

William G. Clayton, Jr.
INVENTOR
BY Victor J. Evans & Co.
ATTORNEYS

Patented Jan. 19, 1943

2,309,045

UNITED STATES PATENT OFFICE 2,309,045

TRIMMING MACHINE

William G. Clayton, Jr., Memphis, Tenn.

Application August 4, 1941, Serial No. 405,397

3 Claims. (Cl. 164—61)

The present invention relates to new and useful improvements in trimming machines.

An object of the invention is to provide a trimming machine of generally improved design.

Another object of the invention is the provision of a machine which is particularly efficient for trimming fabric employed in the manufacture of automobile tires.

A further object of the invention is the provision of a machine of the aforesaid character which very accurately and smoothly trims the material fed therethrough.

A still further object of the invention is to provide a trimming machine having readily adjustable cutters for trimming work of various sizes.

Still another object of the invention is the provision of a trimming machine of the above character which is efficient and reliable in operation.

Still another object of the invention is the provision of a trimming machine of the aforesaid character which is relatively simple, compact and durable in construction.

Other objects and advantages of the invention will become apparent as the description progresses.

In the accompanying drawings forming a part of this specification and in which like numerals are employed to designate corresponding parts throughout:

Referring in detail to the drawings, wherein for the purpose of illustration is shown a preferred example of the invention, 10 generally designates the front frame section of the machine supporting on end portions thereof a pair of transversely extending rollers 11 having their end gudgeons 12 journaled in bearings 13 secured on the frame. An endless conveyor belt 14 is trained over the rollers 11 and provides a horizontal longitudinally extending top reach for feeding material through the machine.

Figure 1:
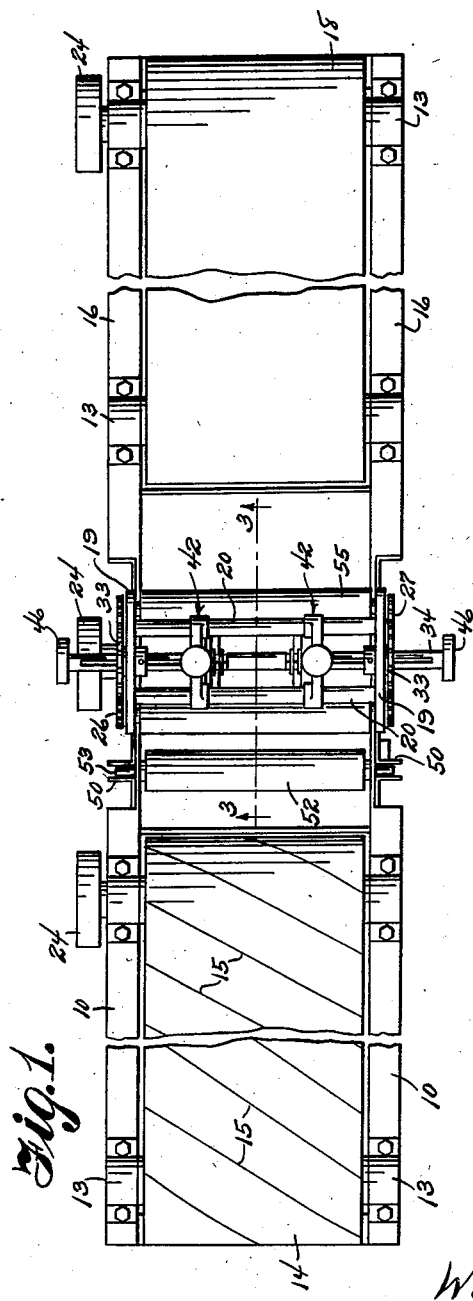
Figure 1 is a top plan view of a machine embodying the invention.
Figure 2:
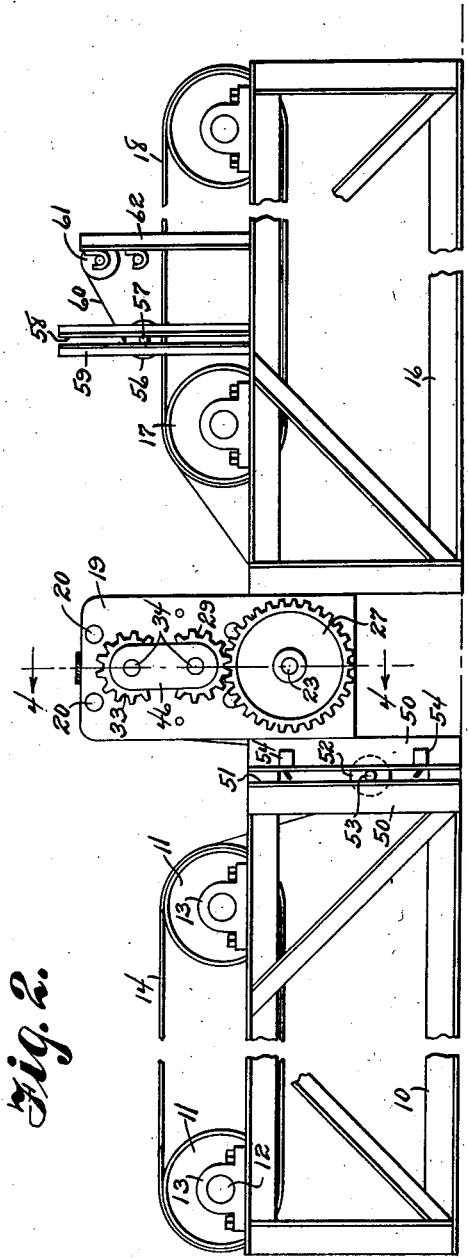
Figure 2 is a side elevational view of the same.

As shown at Figure 1 the belt 14 is preferably provided with a plurality of oblique lines 15 extending at varying angles with reference to the top reach of the belt to afford guides for bias cutting and splicing of sections of sheet material.

Spaced rearwardly of the frame 10 is a similar frame section 16 having conveyor rollers 17 journaled thereon with an endless conveyor belt 18 trained over the rollers. Between the inner spaced ends of the frame sections 10 and 16 and to cross pieces extending therebetween are secured a pair of complementary frame plates 19 of vertically elongated form projecting above the horizontal front and rear sections. Rigidly fastened to and extending between the vertical center frame sections 19 are a plurality of, in the present instance four, transversely extending members 20, preferably round metallic bars arranged in parallel pairs in the upper and intermediate portions of the plates. Through ball bearings 21 mounted in transversely aligned apertures 22 in the lower portions of the plates is extended a drive shaft 23 having keyed or otherwise fastened on one end the hub portion of a drive pulley 24, adapted for connection, through a belt, with a suitable source of power. Inwardly of the pulley 24 the shaft 23 has fixed therein the hub portion 25 of a relatively large spur gear 26, the hub portion being extended laterally to engage the bearing 21. On the opposite end of the shaft is similarly mounted a spur gear 27, corresponding to the gear 26, secured on a reduced threaded extension of the shaft 23 by a nut 28.

The spur gears 26 and 27 are mounted to mesh with spur pinions 29 mounted vertically at each side of the center frame and having hub portions extending through and journaled in ball bearings 30 mounted in bearing openings in elevated portions of the plates. The hubs 31 of these pinions project inwardly of the frame plates and are maintained in position by nuts 32. The pinion 29 at each side of the frame meshes with a corresponding pinion 33 mounted thereabove in a similar manner, providing a train of three gears on the outer sides of the center frame structure.

Figure 4:
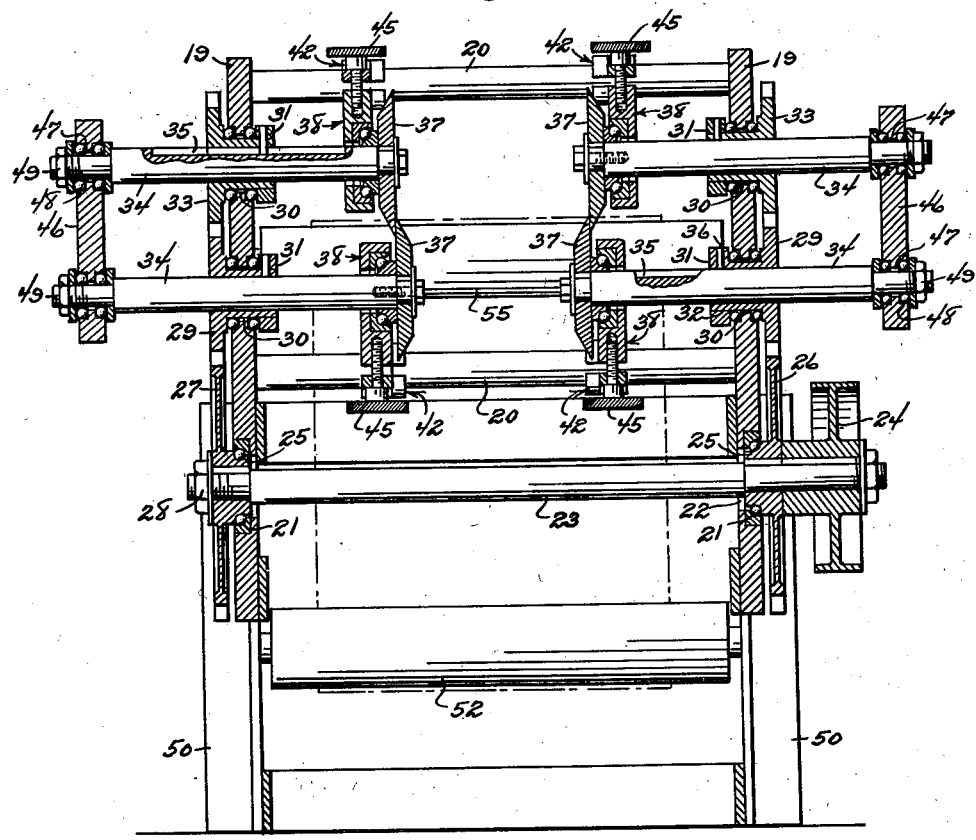
Figure 4 is an enlarged transverse section taken on line 4—4 of Figure 2.
Figure 5:
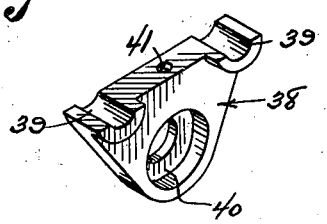
Figure 5 is a perspective view of one of the support members of the machine.
Figure 6:
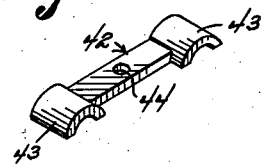
Figure 6 is a perspective view of a complemental part of the support.

Slidably extended through the bores of the pinions 29 and 33 are four transverse shaft sections 34 each of which is provided with a longitudinally extending groove 35 engaging the inner end of a pin 36 fixed to extend radially through aligned apertures in the retaining nuts and the hubs of the pinions. On the inner ends of the shaft sections 34 are rigidly secured cutter elements 37 in the form of disks having beveled peripheral edges. As clearly illustrated at Figure 4 the beveled edges of the uppermost pair of disks face outwardly of the frame while those of the lower disks face inward so that the coacting superposed pairs at each side of the frame are disposed with the margins of their plane sides in overlapping arrangement.

Figure 3:
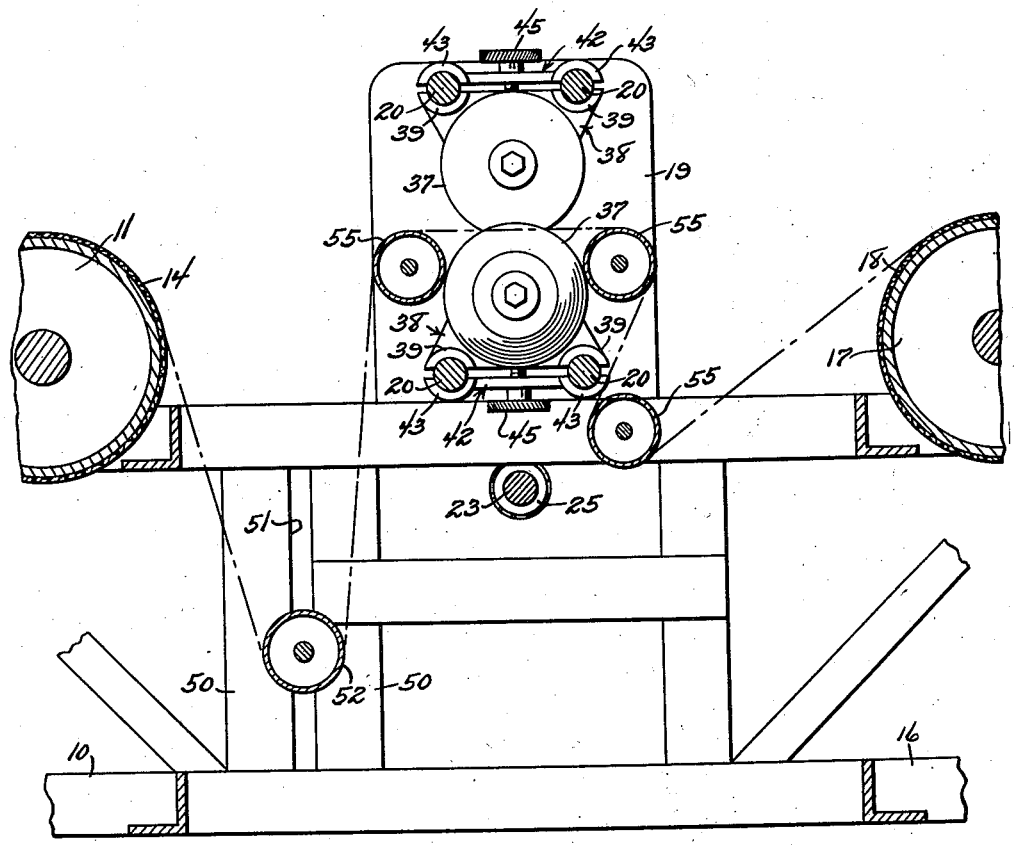
Figure 3 is an enlarged fragmentary longitudinal section taken on line 3—3 of Figure 1.

The inner disk carrying end portions of the shaft section 34 are adjustably supported on the frame structure through the medium of four support members, each of which embodies an approximately triangular-shaped body section 38 formed at the ends of one side edge with bearing elements 39 in the form of axially split half bearings and provided with a counterbored bearing opening 40. In one side edge of the body section 38 between the grooved bearing elements 39 is provided an interiorly threaded bore 41. With this body member is cooperatively related a cap member 42 having an elongated bar formed at the ends with semicircular half bearing elements 43. At its intermediate portion the bar of the cap 42 is provided with an aperture 44. When assembled on the machine these supports are arranged so that the split body bearings 39 are fitted to engage a transversely spaced pair of the guide rods 20 while the cap 42 is disposed so that the bearing elements 43 are fitted over opposed parts of the rods, the cap being secured to the support body by a screw 45 extended through the aperture 44 in each cap bar and engaging the bore 41 in the body. As will be apparent from Figures 3 and 4 a pair of the supports 38 is disposed in depending relation on the upper pair of rods 20 while the other pair is mounted in upstanding positions on the bottom pair of guide rods. When the screws 45 are loosened the supports are slidable along the rods and may be tightly fastened in adjusted position by tightening these screws. Each of the shaft sections 34 extend through and are journaled on bearings mounted in the opening 40 of one of the support members 38.

The outer ends of each pair of shaft sections 34 on the respective sides of the center frame structure are connected by a connecting member 46 in the form of an elongated bar provided with spaced bearing openings 47 in which are mounted ball bearings 48. The reduced outer end portions of the shaft sections 34 extend through these bearings 48 and are secured against axial displacement by the shoulders therein and nuts 49 threaded on the outer ends of the sections. These spacing connections firmly maintain the complementary pairs of shaft sections 34 in parallel arrangement.

Intermediate the front frame section 10 and the center frame plates 19 are mounted, at each side of the machine, a pair of vertically arranged angle bars 50 disposed so that a pair of their flanges project laterally to assume spaced parallel positions defining a vertical slot 51 therebetween. Between these pairs of angle bars is mounted a transversely disposed roller 52 having end gudgeons 53 projecting into the slots 51 so that the roller is rotatable and vertically movable. To the angle bars at one side of the frame structure are connected a pair of electric switches 54 of suitable known construction arranged adjacent the upper and lower portions thereof and having actuating levers extended across the slot 51. These elements are disposed so that they are operable by the gudgeons 53 of the roller when the latter attains predetermined vertical positions.

Rotatably supported on and extending transversely between the frame plates 19 are three guide rollers 55, a pair being disposed at opposed sides of the cutter disks 37 so as to cause the web of material to pass horizontally through the co-acting cutting edges, while another is mounted at a lower rearward position to guide the web at a downward and forward angle and onto the rear conveyor belt 18.

The web may be rolled by means of roller mechanism associated with the belt 18, being wound by contact with the belt on a roller 56 having its shaft extensions or gudgeons 57 rotatably extended through slots 58 in upstanding frame pieces 59. As the strip or web is rolled upon the roller 56 a liner 60 is wound between the convolutions thereof from a roll 61 supported on brackets attached to supports 62. As is known in the art this winding or reeling apparatus may comprise two sets of winding roll and liner support structures to permit removal of one roll and insertion of another without stopping the machine.

The machine operates as follows:

The strips of web forming material, as for instance rubberized tire fabric, are assembled and spliced on the top reach of the endless conveyor belt 14. These pieces may constitute sections of parts remaining after the initial bias cutting operation and parts of rolls of the fabric, which it has been customary to trim by hand for use in connection with the building of smaller sized tires. In splicing such sections or pieces corner portions frequently project from the side edges of the web especially in cases where the bias angle is changed. The lines 15 marked on the belt 14 serve as guides for splicing the pieces at desired arrangement. The web thus formed is trained downwardly at the rear portion of the belt 14 and under the roller 52 which is mounted in a lower plane from whence it is directed over the horizontally spaced pair of guide rollers 55 to feed the web transversely through the rotary cutters. From the rear upper roller 55 the web is directed downwardly and forwardly under the lower roller 55 from whence it is trained onto the top reach of the endless belt 18 for winding on the roller 56 in conjunction with a liner or strip 60. In order to maintain the horizontal reach of the web between the rollers 55 in sufficiently taut condition for proper cutting but avoid undue tension upon the spliced joints of the sections of the web the roller 52, which is of predetermined weight, normally rests on a loop thereof between the feed belt and the cutter guides.

The machine may be driven, from a suitable source of power, as for example electric motors, to actuate the belts 14 and 18 independently of one another and to rotate the cutter disks. In this manner the belt 14 feeds the web at a constant speed while the belt 18 frictionally rotating the reeling roller 56 exerts a tension to pull the web through the intermediate trimming mechanism. Due to the difficulty of maintaining the feed movement and the tension on the web in exact correspondence and the importance of maintaining suitable limited tension thereon the roller 52 is mounted to allow vertical movement in accordance with variation in the traveling speed of the front and rear portions of the web. Should the belt 18 operate to draw the web through the trimmer at a rate of linear speed faster than the feeding speed from the belt 14 the roller 52 will be elevated and the gudgeon 53 at one end thereof will eventually contact the lever of the upper control switch to stop the motor driving the belt 18 so that the roller 52 will be disposed in equalizing position. In the event that the web is fed from the belt 14 at a speed in excess of that at which it is drawn through the trimmer the roller 52 will drop and trip the lever of the lower switch 54 to arrest movement of the feed belt. In this manner the required tension is maintained on the web. The upper and lower switches 54 may advantageously be known types of automatic limit switches spring pressed to close and automatically cause resumption of the operation of the stopped conveyor belt upon removal of the actuating gudgeon by movement of the roller 52.

As will be noted the coacting pairs of cutter disks 37 at each side of the trimmer may be axially adjusted transversely of the center frame section by movement of the cutter drive shaft sections 34 through the gears 33 and corresponding movement of the support members 38 with relation to the transverse bars 20. This will enable variation of the cutters to accommodate spliced strips or webs of varying width and to effect marginal trimming in a longitudinal line within the limits of the center of the frame and its side structure.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a machine for trimming tire fabric, a frame, a pair of parallel shafts mounted for transverse sliding movement at each side of the frame, means for simultaneously rotating the said shafts, cutter disks mounted in coacting cutting relation on the inner ends of the shafts, support means associated with the said shafts for supporting the same in adjusted position, a plurality of rollers mounted on the frame adjacent the said shafts to guide a web of material horizontally through the cutter disks, a conveyor for preparing and feeding a web of material to the said cutter, means for winding the trimmed web, and means for maintaining the said web under predetermined tension.

2. In a trimming machine, a frame, a plurality of rotatably driven shafts slidably mounted on the frame, coacting cutter elements secured on the shafts and adjustable transversely of the frame, a plurality of rods extending transversely of the frame, a plurality of support members slidably mounted on the said rods and rotatably supporting the shafts adjacent the cutters, means for releasably securing the supports in adjusted position on the said rods, and means for feeding a web of material horizontally and in relatively taut condition through the cutters.

3. In a trimming machine, a pair of vertical frame plates, a drive shaft journaled transversely on the plates, a plurality of bars fastened to and extending between the said plates, a drive gear secured on each end of the drive shaft, a pair of intermeshing pinions rotatably mounted on each frame plate driven by the drive gear in each side thereof, a shaft connected with and slidable transversely through each of the said pinions, and coacting cutter disks secured on the pair of shafts at each side of the frame.

WILLIAM G. CLAYTON, Jr.